Patented Nov. 2, 1926.

1,605,897

UNITED STATES PATENT OFFICE.

OTTO LIEBKNECHT, OF FRANKFORT-ON-THE-MAIN, GERMANY, ASSIGNOR TO THE DEUTSCHE GOLD- & SILBER-SCHEIDEANSTALT VORMALS ROESSLER, OF FRANKFORT-ON-THE-MAIN, A CORPORATION OF GERMANY.

PROCESS FOR THE GAINING OF HYDROCYANIC ACID FROM GASEOUS MIXTURES CONTAINING HYDROCYANIC ACID.

No Drawing. Application filed August 9, 1924. Serial No. 731,215, and in Germany August 1, 1923.

The object of the invention is the gaining of hydrocyanic acid from gas mixtures containing hydrocyanic acid, for instance from raw gases containing hydrocyanic acid. The term "raw gases" means such untreated hydrocyanic acid bearing gases as evolve from destructive distillation of nitrogeneous materials, acidification of cyanides and so forth. In these gases are present hydrocyanic acid in varying amounts mixed with air, carbon dioxide, carbon monoxide and the like.

It has been found that substances which are porous in a high degree, for instance active charcoal, are capable of separating the hydrocyanic acid from other gases by selective adsorption in such a way, that the active charcoal brought in contact with the gaseous mixture take up very considerable quantities of hydrocyanic acid, which then can be discharged from the charcoal for instance by evaporation. Thus it is possible to pass vent gases from hydrocyanic acid processes through chambers containing the absorptive medium and obtain a high recovery of hydrocyanic acid as well as assuring a safe working condition. By "active" charcoal is meant charcoal which has been chemically or thermally treated or both so as to greatly increase its adsorptive power.

Thorough investigations have shown that particularly good results are obtained by effecting the adsorptive process with cooperation of liquids which are capable of absorbing the hydrocyanic acid, for instance by using active charcoal imbibed with water.

Further investigations have shown that such adsorbents which by nature are acid or which have been acidulated by adapted treatment are particularly suited for carrying out the process using acidly reacting active charcoal, which is impregnated with water. The charcoal may be charged with hydrocyanic acid up to about 150% and more of its weight.

The impregnation of the adsorbing material with a liquid capable of absorbing hydrocyanic acid, for instance water, can be effected in the simplest manner, for instance by treating the adsorbent with steam. The impregnation with the absorbing liquid may be effected, for example, by preliminary treatment or simultaneously with the adsorption of the hydrocyanic acid.

The acidification of such adsorbing substances which by nature are not acid, or the raising of the acid qualities of feebly acid adsorbing material may be effected, for instance, by treating with acid gases or vapours or with acid substances in liquid or diluted form. Also the last treatment may be carried out before the adsorption of the hydrocyanic acid as well as simultaneously.

Beside active charcoal also other substances of great adsorptive power have proved suitable. Amongst others, activated silicic acid of large surface may be used. This activated silicic acid is absorptive silicic acid commonly known as silica gel. Also several adsorbing means may be employed simultaneously, preferably such adsorbing substances which are composed of active charcoal and incombustible adsorbing substances. In all these cases the cooperation of liquids capable of adsorbing hydrocyanic acid as well as the employment of acid or acidulated adsorbing means have proved advantageous.

What I claim is:

1. A process for separating hydrocyanic acid from gaseous mixtures containing hydrocyanic acid consisting in withdrawing the hydrocyanic acid from the mixture by means of a highly porous body moistened with a liquid capable of absorbing hydrocyanic acid.

2. A process for separating hydrocyanic acid from gaseous mixtures containing hydrocyanic acid consisting in withdrawing the hydrocyanic acid from the mixture by means of an acid treated active charcoal moistened with a liquid capable of absorbing hydrocyanic acid.

3. A process for separating hydrocyanic acid from gaseous mixtures containing hydrocyanic acid consisting in withdrawing the hydrocyanic acid from the mixture by means of active charcoal moistened with water.

4. A hydrocyanic acid containing body comprising an acid treated active charcoal moistened with a liquid capable of absorbing hydroyanic acid.

5. A hydrocyanic acid containing body comprising an active charcoal moistened with water.

In testimony whereof I affix my signature.

OTTO LIEBKNECHT.